United States Patent [19]

Takeda et al.

[11] Patent Number: 4,941,003

[45] Date of Patent: Jul. 10, 1990

[54] IMAGE FORMING APPARATUS

[75] Inventors: Atsushi Takeda; Masahiro Itoh; Hiroaki Tsuchiya, all of Yokohama, Japan

[73] Assignee: Canon Kabushiki Kaisha, Tokyo, Japan

[21] Appl. No.: 260,311

[22] Filed: Oct. 20, 1988

[30] Foreign Application Priority Data

Oct. 22, 1987 [JP] Japan ................................ 62-267524

[51] Int. Cl.[5] ............................................ G01D 15/00

[52] U.S. Cl. ................................ 346/160; 346/160.1; 346/154

[58] Field of Search .................... 346/160, 107 R, 108, 346/154, 160.1; 364/519; 358/300, 302, 296

[56] References Cited

U.S. PATENT DOCUMENTS 4,491,875 1/1985 Kawamura ......................... 358/298

4,587,536 5/1986 Saito et al. .......................... 346/157

FOREIGN PATENT DOCUMENTS 190354 3/1986 Japan .................................. 346/160

*Primary Examiner*—Arthur G. Evans

*Attorney, Agent, or Firm*—Fitzpatrick, Cella, Harper & Scinto

[57] ABSTRACT

After a first image is formed on an image bearing member, the potential of the image bearing member is attenuated, and then, the image bearing member is re-charged. Thereafter, a second image is formed. The image forming apparatus includes a potential sensor for detecting the surface potential of the image bearing member, and in accordance with the output of the potential sensor, amount of potential attenuation and/or amount of re-charging is controlled so that the potential difference between the potential of the first developed portion after the re-charging and the background potential is converged into a predetermined target range.

21 Claims, 5 Drawing Sheets

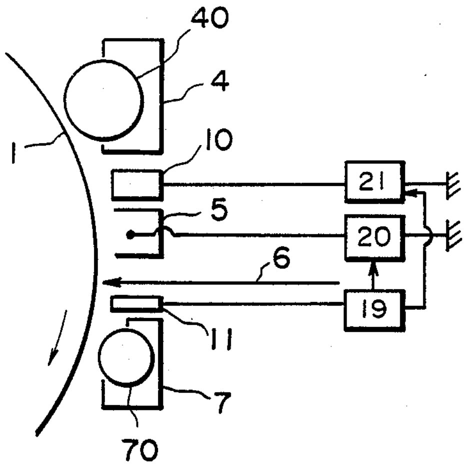
FIG. 3
FIG. 4A
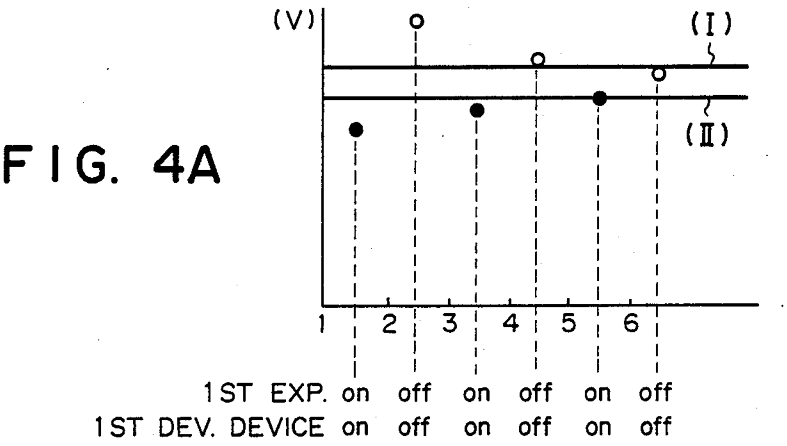
FIG. 4B
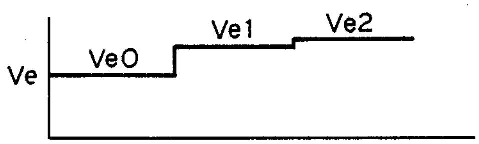
FIG. 4C
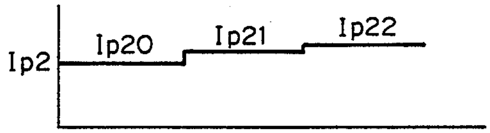

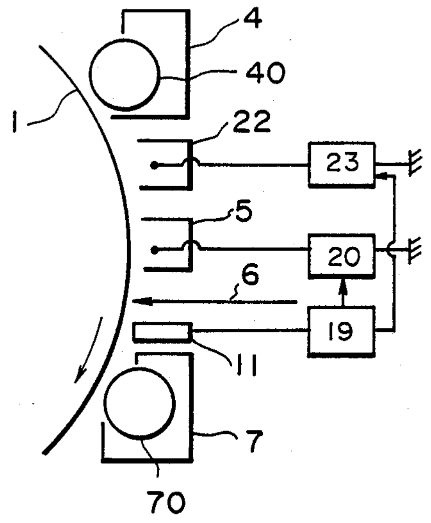
FIG. 5
FIG. 6A
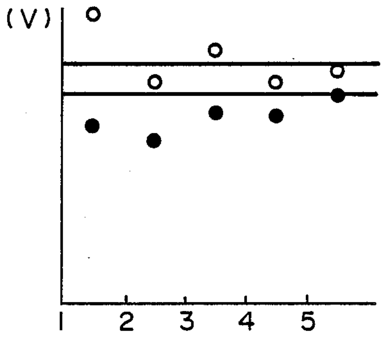
FIG. 6B
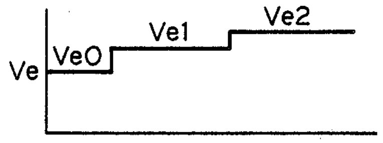
FIG. 6C
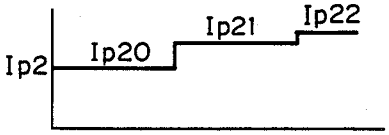

IMAGE FORMING APPARATUS

FIELD OF THE INVENTION AND RELATED ART

The present invention relates to an image forming apparatus, more particularly to an image forming apparatus capable of forming multi-color images.

Further particularly, the present invention related to an electrophotographic type image forming apparatus capable of forming two-color images.

In such an apparatus, an image bearing member, more particularly, an electrophotographic photosensitive member is uniformly charged by a first charger, and is exposed to a first light image to form a first electrostatic latent image, which is developed into a first toner image; the photosensitive member is re-charged by a second charger, and then is exposed to second image light so that a second latent image is formed and is developed with second toner having a color different from the first toner, by which a second toner image is formed, whereby a two color image can be produced through one image formation cycle.

The change of the surface potential of the photosensitive member in such a two-color electrophotographic apparatus is as follows. As shown in FIGS. 7A–7F, the surface of the photosensitive member is uniformly charged to a potential of +500 V, for example, by a first charger (FIG. 7A), and then is exposed to light information corresponding to an image by a first exposure means, by which a first latent image is formed wherein the surface potential of the exposed area is, for example, +60 V (FIG. 7B). The first latent image is reverse-developed by a first developing device containing red toner, for example, wherein a developing roller of the developing device is supplied with a bias voltage provided by superposing a DC voltage of +410 V and an AC voltage having a frequency of 2000 Hz and 1500 Vpp (FIG. 7C). Subsequently, the photosensitive member is re-charged by a second charger, by which the potential of the background area becomes +600 V, and the potential of the first toner becomes +420 V (FIG. 7D). Then, the second exposure means exposes the photosensitive member to second light information corresponding to a second image, by which a second latent image having an exposed potential of +60 V, for example, is formed (FIG. 7E). The second latent image thus formed is developed by the second developing device containing black toner, for example, wherein the developing roller is supplied with a bias voltage provided by superposing a DC voltage of +370 V and an AC voltage having a frequency of 1600 Hz and a voltage of 1300 Vpp (FIG. 7F). In the second development, the first toner image is not developed. The two color image provided in this manner on the photosensitive member is generally transferred onto a transfer material, and is discharged out of the apparatus as a two-color print.

However, in such an apparatus, the potential difference between the background potential after the photosensitive member is re-charged by the second charger and the potential of the first toner image portion is large. Since the voltage of the DC component of the bias voltage in the second developing device is lower than the first toner potential, there is a problem that reversely charged toner is deposited onto the background area. If there is unintended first toner in the background area, the toner can be introduced into the second developing device by the electric field between the background potential and the second developing bias.

Methods of making the first toner portion potential after the re-charge substantially equal to the background potential, are known as disclosed in Japanese Laid-Open Patent Application Nos. 23952/1982, 116553/1983, 38762/1984, 124353/1984. In those methods, the photosensitive member is electrically discharged by application of light after the first development; the photosensitive member is electrically discharged by an AC corona discharger after the first image is developed; or a scorotron is used for the re-charging.

However, according to those method, both of the first toner portion potential after the re-charge and the background potential are changed due to the parameter of the potential converging means, the amount of exposure in the method of discharging by light, for example, and the current level in the re-charge. Therefore, it is difficult or complicated to stabilize each of the potentials at desired levels.

SUMMARY OF THE INVENTION

Accordingly it is a principal object of the present invention to provide an image forming apparatus capable of providing a high quality multi-color image.

It is another object of the present invention to provide an image forming apparatus which is substantially free from problems of mixture of colors on the image bearing member or in the developer container.

It is a further object of the present invention to provide an image forming apparatus wherein a developer which is charged to a polarity which is opposite to the intended polarity is prevented from being deposited on the background area of the image bearing member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 is a sectional view illustrating a function of potential attenuating means in FIG. 1 apparatus.

FIG. 4A is a graph showing an example of surface potential change of the photosensitive drum when the potential is controlled.

FIG. 4B is a graph showing an example of a change of a voltage applied to light projecting means when the potential is controlled.

FIG. 4C is a graph showing an example of a change of a re-charging current by a second charger when the potential is controlled.

FIG. 5 is a partial sectional view illustrating another example of a potential attenuating means.

FIG. 6A is a graph showing an example of a change of the surface potential of the photosensitive drum when the potential is controlled in another embodiment of the present invention.

FIG. 6B is a graph showing an example of a change of a voltage applied to the light application means when the potential is controlled.

FIG. 6C is a graph showing an example of a change of a re-charging current by a second charger when the potential is controlled.

DETAILED DESCRIPTION OF THE PREFERRED EMBODIMENTS

The preferred embodiments of the present invention will be described in conjunction with accompanying drawings.

In the following description, an electrophotographic apparatus capable of forming two-color images is taken as an exemplary image forming apparatus according to the embodiments of the present invention. However, the present invention is not limited to the two-color image forming apparatus, but is applicable to an image forming apparatus capable of forming two or more color images.

Figure 1:
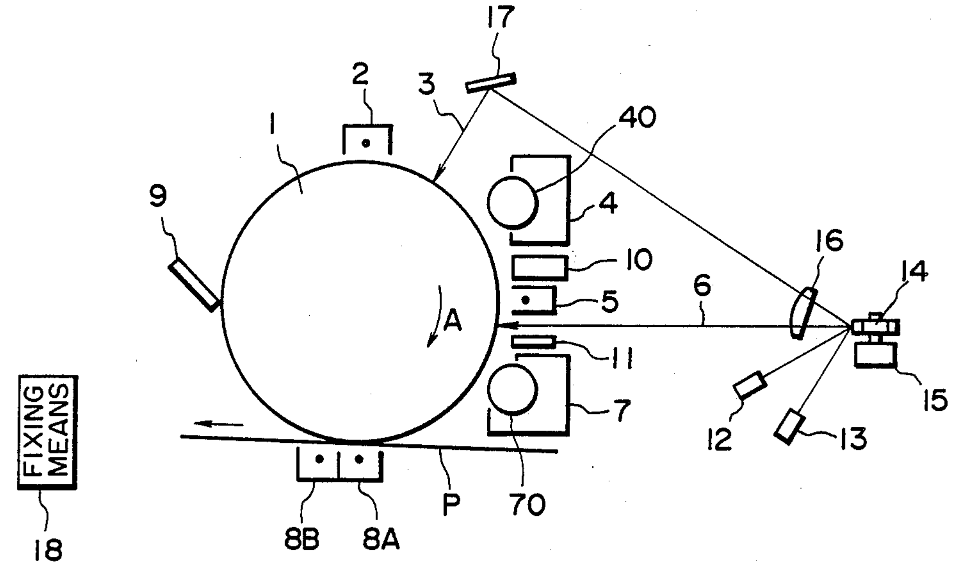
FIG. 1 is an electrophotographic apparatus capable of forming two-color images as an exemplary image forming apparatus according to the present invention.

Referring to FIG. 1, there is shown an electrophotographic apparatus according to an embodiment of the present invention. The apparatus comprises an electrophotographic photosensitive drum 1 rotatable in a direction indicated by an arrow A. The drum 1 is an image bearing member having a photoconductive layer such as amorphous silicon or the like.

Around the drum, there are disposed various parts of image forming means. More particularly, the disposed are a first charger 2, a first exposure means 3, a first developing device 4, a second charger (recharger) 5, a second exposure means 6, a second developing device 7, a transfer charger 8A, a separation discharger 8B and cleaning means 9.

According to the present invention, discharging means (potential attenuating means) is disposed between the first developing device 4 and the second charger 5. More particularly, the discharging means in this embodiment is a light application means 10 having, for example, an EL element (electro-luminescence), LED elements, a laser source or halogen lamp. Further, between the second charger 5 and the second developing device 6 a potential detecting means 11 for detecting the surface potential of the photosensitive drum 1 is disposed. The arrangement is explained as to the case of two color image formation. When a three-color image is formed, the potential attenuating means and the re-charging means are disposed downstream of each of the developing devices except for the last developing device.

Referring to FIGS. 2A–2G, the operation of the two-color electrophotographic apparatus having the above structure will be described.

Figure 2A:
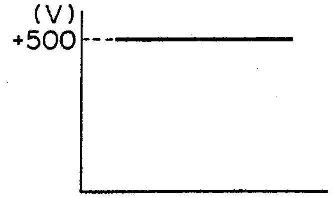
FIGS. 2A–2G illustrate change of a surface potential of a photosensitive member in each of image forming steps in the image forming apparatus of FIG. 1.
Figure 2E:
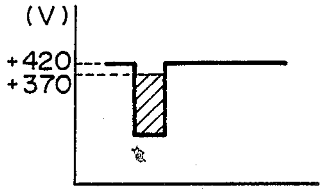
Figure 2B:
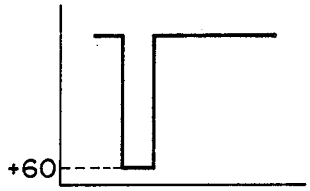
Figure 2F:
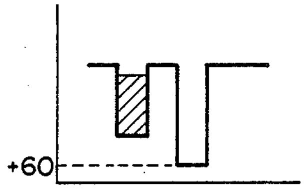
Figure 2C:
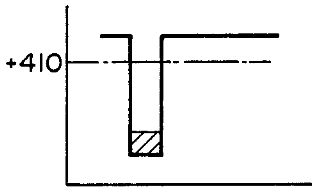
Figure 2G:
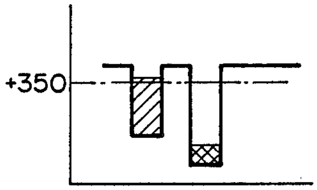
Figure 2D:
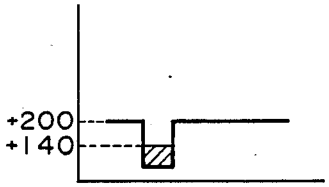
Figure 7A:
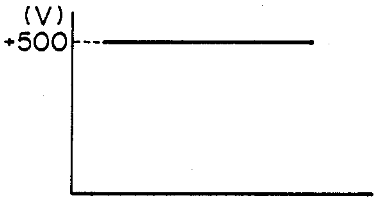
FIG. 7A and 7F show a change of the surface potential of the photosensitive drum in each of image forming steps to illustrate image forming process in a conventional electrophotographic apparatus capable of forming two-color images.
Figure 7D:
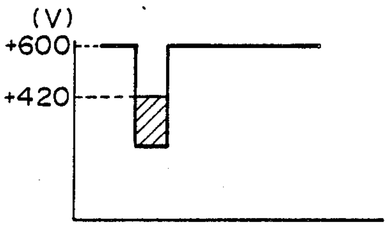
Figure 7B:
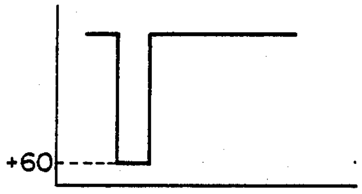
Figure 7E:
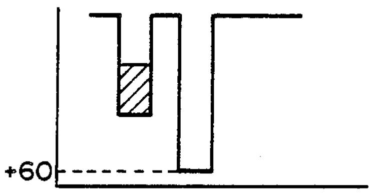
Figure 7C:
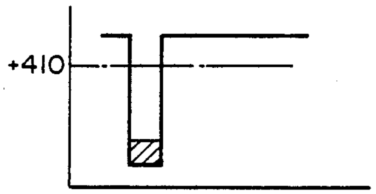
Figure 7F:
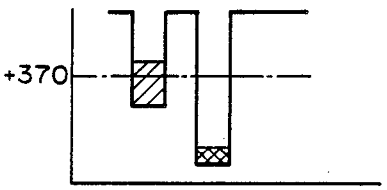

The photosensitive drum 1 rotating in the direction A, is uniformly charged to a potential of +500 V, for example, by the first charger 2 (FIG. 2A). The first exposure means 3 includes a first semiconductor laser source for emitting a first laser beam modulated in accordance with a first image signal, and a rotational polygonal mirror 14 which is driven by a motor 15 to deflect the first laser beam to scan the photosensitive drum 1 with light information in accordance with the first image information through an imaging lens 16 and folding mirror 17. By the first exposure means 3, a first latent image is formed in accordance with the first image information having an exposed surface potential of +60 V, for example, on the photosensitive drum 1 (FIG. 2B). The first latent image is developed by the first developing device 4 containing red toner positively charged, for example. In the developing apparatus 4, a developing roller 40 is supplied with a bias voltage provided by superposing a DC voltage of +410 V and an AC voltage having a frequency of 2000 Hz and a peak-to-peak voltage of 1500 Vpp, for example, the development being a reverse development (FIG. 2C). After the first developed image (first toner image) is formed by developing the first latent image by the first developing device 4, the photosensitive drum 1 is exposed to uniform light by the light application means 10, by which the potential of the first toner portion after the whole surface uniform exposure and the potential of the non-toner portion after the whole surface exposure (background potential) become +140 V and +200 V, respectively, for example, that is, the potential difference therebetween is made smaller (FIG. 2D). The photosensitive drum 1 is uniformly re-charged by the second charger 5, by which the first toner portion potential becomes +370 V, whereas the non-toner portion potential (background potential) becomes +420 V (FIG. 2E).

In other words, the non-toner portion potential (background potential) is at such a level that it is slightly higher than the toner portion potential, and that the toner portion potential is such that it is sufficiently contrasted to the second latent image.

The second exposure means 6 includes a second semiconductor laser source 13 of using a second laser beam modulated in accordance with a second image signal, and a rotational polygonal mirror 14 which is driven by a motor 15 and which deflects the second laser beam to scan the photosensitive drum 1 with the light information in accordance with the second image information through the imaging lens 16, similarly to the first exposure means 3. By the scanning operation by the second exposure means, a second electrostatic latent image is formed on the photosensitive drum. The second latent image has an exposed portion surface potential of +60 V for example (FIG. 2F).

The second latent image is developed by the second developing device 7 containing black toner positively charged, for example. In the second developing device 7, a developing roller 70 is supplied with a bias voltage provided by superposing a DC voltage of +350 V and an AC voltage having a frequency of 1600 Hz and a peak-to-peak voltage of 1300 Vpp, so that the first toner image is not developed, and only the second latent image is developed, so that a second developed image (second toner image) is formed (FIG. 2G).

The two color image in red and black formed on the photosensitive drum 1 is transferred at once by the transfer charger 8A onto a transfer material P which is a light receiving member, and then, the transfer material P after the transfer is separated from the photosensitive drum 1 by the separation discharger 8B. The transfer material P is conveyed by an unshown conveying means to an image fixing means 18 where the image is fixed, then, the transfer material is discharged out of the apparatus as a two-color print.

On the other hand, the photosensitive drum 1, after the image is transferred, is cleaned by the cleaning means 9, so that the residual toner is removed therefrom to be prepared for the next image forming operation.

As described, in an electrophotographic apparatus according to this embodiment, the first latent image formation, the first development, the second latent image formation, the second development and the overall image transfer of the first and second developed images are executed during one full turn of the photosensitive drum 1.

In the two-color image forming process described above, the photosensitive drum 1 is exposed to uniform light by the light application means after the first developed image is formed, so that the surface potential of the photosensitive drum 1 is attenuated in the step shown in FIG. 2D. If, at this time, the amount E of the whole surface exposure is large, the potential of the photosensitive drum possibly does not reach a required level, or the potential of the first toner image portion after the re-charge becomes possibly higher than the non-toner portion potential (background potential), resulting in scattering of toner, and therefore, deterioration of the image quality. On the contrary, if the amount E of the whole surface exposure is too small, the potential difference between the first toner portion potential after the re-charge and the non-toner portion potential becomes too large resulting in production of foggy background during the second development. Even if the material of the photosensitive member is the same, the charging property (surface potential vs. current) and E-V (surface potential vs. exposure amount) are slightly different, and/or the wavelength of the light provided by the light application means is varied, and therefore, the non-toner portion potential (background potential) after the re-charge and the toner portion potential of the first toner image are required to be controlled, respectively.

Detailed description will be made as to method of controlling the light application means 10 and the second charging means 5. As described hereinbefore, in the embodiment shown in FIG. 1, a potential detecting means 11 is disposed between the first charger 5 and the second developing device 7 so as to detect the surface potential of the photosensitive drum 1. The output signal of the potential detecting means 11 is transmitted to a control means 19 shown in FIG. 3, and in response to the output signal, the control means 19 transmits control signals to the power sources 21 and 20 in order to control the output of the light application means 10 and the second charger 5.

FIG. 4A shows the potential Vt of the toner image by the first developing device (back dots) and the background potential Vd (circles) detected by the potential detecting means 11. The potential of the toner image portion and the potential of the background portion are those after the photosensitive member is exposed by the light application means 10 and is re-charged by the second charger 5. In this Figure, the solid lines (I) and (II) indicate a target background potential (Vdta) which is +420 V, for example, in this embodiment and a target first toner image portion potential, respectively. The first toner image potential is determined on the basis of a target level of a potential difference between the background portion potential—first toner image portion potential (Vd−Vt)ta, for example 50 V in this embodiment. FIG. 4B shows an effective voltage Ve applied to the light application means 10, and FIG. 4C shows re-charging current Ip2 to the second charger 5. In those Figures, Ve0 is an initial level of a voltage applied to the light application means 10, Ip20 is an initial level of the re-charging current of the second charger 5; Vei and Ip2i are those values at i-th operations (i=1, 2, 3, . . . ). Therefore, Ve1, Ip21 are those levels at first and second operations, respectively.

The i-th measurements are expressed as (Vd−Vt)i−1, V(i−1).

Referring to FIGS. 4A-4C, the potential control in this embodiment will be described in detail. The times of the potential controls are when the power source for the main assembly of the image forming apparatus is actuated, when a predetermined period of time passes after the actuation of the power source or when a predetermined number of image forming operations are performed after the power source is actuated, in any case before an intended image formation.

An area of the photosensitive drum to be detected by the potential detecting means 11 is uniformly charged by the first charger 2 and is exposed to a reference image information light stored in the apparatus, by the first exposure means 3, and is developed by the first developing device 4. The area of the photosensitive drum 1 after development is exposed to the light by the light application means 10 supplied with a voltage Ve0, and is re-charged by the second charger 5 with the current of Ip20, and then, the potential of the toner image portion by the first developing device is measured as Vt0.

Next, the photosensitive drum 1 charged by the first charging device 2 is exposed to light by the light application means 10 and is re-charged by the second charger 5 with the first exposure means 3 and the first developing device 4 not operated, and then, the potential of the non-toner portion, that is, the background potential portion is measured as Vd0. Therefore, at this time, the potential difference between the background potential and the first toner portion potential is (Vd−Vt)0=Vd0−Vt0.

If the difference [(Vd−Vt)0−(Vd−Vt)ta] between the target level (Vd−Vt)ta and the initial level (Vd−Vt)0 is outside a predetermined converge target range, which is, for example, not less than −30 V and not more than +20 V, the control means 19 operates in accordance with the detection signal by the potential detecting means 11 to transmit a signal to the power source 21 for changing the effective applied voltage to the light application means 10, in accordance with the following equation:

$$Ve1 = Ve0 + \alpha[(Vd-Vt)0-(Vd-Vt)ta]$$

where αis a coefficient of effective applied voltage control.

In this embodiment, the applied voltage and the light amount change are proportional.

If, on the other hand, the potential difference (Vd0−Vdta) between the target level Vdta and the initial level Vd0 is outside a predetermined range, for example, which is the range not less than—30 V and not more than +30 V, the control means 19 is operated in accordance with a detection signal by the potential detecting means, more particularly, the control means 19 transmits a signal to the power source 20 to change the re-charging current of the second charger 5 in accordance with the following equation:

$$Ip21 = Ip20 + \beta(Vd0-\mathrm{Vdta}) + \gamma(Ve1-\mathrm{Ve0})$$

where $\beta$ is a coefficient of the re-charging current control, and $\gamma$ is a coefficient of correction due to change of the effective applied voltage.

After the change is made to provide Ve1 and Ip21, and thereafter, the first toner image portion potential Vt1 and the background potential portion Vd1 are again measured. The same operations are repeated until the potential difference between the background area and the toner image area in accordance with the reference image information and the background potential, are both within the respective ranges. Finally, a desired potential settings are provided. The purpose of controlling the background potential is to assure the sufficient second latent image contrast.

In the foregoing embodiment, when the background potential is measured, the first exposure means 3 is deactuated, but this is not limiting, and the first exposure means 3 may be kept on when the background potential is measured if the amount of light (laser) is sufficiently small by the first exposure means 3.

The coefficients $\alpha$, $\beta$ and $\gamma$ are different if the property of the photosensitive member, material of the developer and/or the developing power or the like are different, and those values are empirically determined.

In the foregoing embodiment, the latent image of the reference image information is developed with the first toner. However, when the potential of the first toner image layer is known, the potential of the first exposure portion not developed by the first toner, after re-charging, may be used instead of measuring the potential of the first toner image portion after the re-charge.

In this embodiment, the whole surface exposure is effected before the re-charge. But, when the whole surface is exposed to uniform light simultaneously with the re-charging, or when the whole surface is exposed after the re-charge, the principle of the present invention can be used in the similar manner.

FIG. 5 shows another embodiment wherein the discharging means includes an AC corona discharging device 22 in place of the discharging means, that is, the light application means described with the foregoing embodiment. In the following description, Vpp is a peak-to-peak voltage applied to the AC corona discharger 22, and Vpp0 is an initial value of the Vpp, and Vpp is an i-th voltage.

First, the initial peak-to-peak voltage Vpp0 is applied to the AC corona discharger 22, and initial re-charging current Ip20 is supplied to the re-charging device 5, and similarly to the foregoing embodiment, the first toner portion potential Vt0 and the background potential Vd0 are measured. The potential difference is $(Vd-Vt)0=Vd0-Vt0$. The toner image portion potential and the background potential are those after the photosensitive member is discharged by the AC corona discharger 22 and is recharged by the second charger 5.

If the value of $[(Vd-Vt)0-(Vd-Vt)ta]$ is outside a predetermined range, for example not less than $-30$ V and not more than 20 V, the control means 19 controls the power source 23 for the AC corona discharger to change the voltage Vpp of the AC corona discharger 22 in accordance with the following equation:

$$Vpp1=Vpp0+\alpha[(Vd-Vt)0-(Vd-Vt)ta]$$

$\alpha$: coefficient of an AC corona discharger voltage control.

On the other hand, if the value of $(Vd0-Vdta)$ is outside the predetermined range, for example, not less than $-30$ V and not more than $+30$ V, the control means 19 supplies a signal to the power source 20 to change the charging current of the re-charger 5 is changed in accordance with the following equation:

$$Ip21=Ip20+\beta(Vd0-Vdta)+\gamma(Vpp1-Vpp0)$$

where $\beta$ is a coefficient of re-charging current control, and $\gamma$ is a coefficient of correction due to change of the AC corona discharging voltage.

The change is made to the Vpp1 and Ip21 in this manner, and then, the first toner image portion potential Vt1 and the background potential portion Vd1 are detected again, and this is repeated until the potential difference between the background potential and the toner image potential in accordance with the reference image information, and the background potential become within the respective predetermined ranges as described hereinbefore. Finally, the desired potential setting is provided.

As described with this embodiment, the same advantageous effects can be provided when an AC corona discharger 22 is not used, and an AC voltage is superposed with the DC voltage of the second charger 5 so that the potential attenuation and the re-charging are simultaneously performed.

In the first and second embodiment, only one potential detecting means 11 is employed, but it is possible that a plurality of potential detecting means are arranged along the length of the photosensitive drum 1. The case where two potential detecting means 11 are arranged along the length of the photosensitive drum 1 in the structure shown in FIG. 3 will be described.

FIG. 6A shows a first toner image potential detected by a potential detecting means, similar to the foregoing embodiment (black dots) and the background potential (circles). The solid lines (I) and (II) indicate a target background potential Vdta and a target first toner image portion potential determined by a target level (Vd-Vt)ta of the potential difference between the background potential and the first toner image portion potential. FIG. 6B shows an effective applied voltage (all surface exposure voltage) Ve to the light application means 10, and FIG. 6C shows the re-charging current Ip2 to the second charger 5. In this Figure, Ve9 is the initial level of the effective applied voltage, Ip20 is an initial level of a re-charging current, and Vei, Ip2i are i-th levels thereof, and (Vd-Vt)i-1 and Vd(i-1) are i-th measurements.

The potential control when two potential detecting means are used will be described, referring to FIGS. 6A–6C. Although the method of the potential control may be the same as those of the first and second embodiments. However, another potential control method will be described, here.

First, an area of the photosensitive member detected by one of potential detecting means is exposed to a reference image information by a first exposure means 3, and the exposed portion is developed by the first developing device 4, so that a first toner image is formed. On the other hand, the area of the photosensitive member to be detected by the other potential detecting means is not exposed to light, and therefore, the toner is not deposited to this area by the first developing device 4.

Then, the light application means 10 is supplied with a voltage Ve0 (initial) to expose the photosensitive drum to the light produced thereby. The re-charger 5 is supplied with the current Ip20, and thereafter, the potential detecting means detects the first toner image portion potential Vt0 and the background potential Vd0. The potential difference is (Vd−Vt)0=Vd0−Vt0.

If [(Vd−Vt)0−(Vd−Vt)ta] is outside a predetermined range, for example, not less than −30 V and not more than +20 V, the voltage applied to the light application means 10 is changed in accordance with the following equation, and the background potential Vd1 is measured.

$$Ve1 = Ve0 + \alpha[(Vd-Vt)0-(Vd-Vt)ta]$$

where $\alpha$ is a coefficient of the effective applied voltage control.

Next, if (Vd1−Vdta) is outside a predetermined range, for example, not less than −30 V and not more than +30 V, the re-charging current to the second charger 5 is changed to the level in accordance with the following equation, and the first toner portion potential Vt2 and the background potential Vd2 are measured:

$$Ip21 = Ip20 + \beta(Vd1 - Vdta)$$

where $\beta$ is a coefficient of re-charging current control.

The same operation is repeated until (the background potential—toner image potential in accordance with the reference image information) and the background potential is within the respective predetermined ranges. Finally, a desired potential is obtained.

In the first, second and third embodiments, the description has been made with respect to the case where the light application means and the second charging means are controls, but it is possible that the toner image portion potential by the first developing device may be changed by changing the developing condition of the first developing device (for example, a developing bias, a peripheral speed of a developing roller or a distance between the developing roller and the photosensitive drum).

As described, according to the present invention, at least one of the potential attenuating means and the second charging means is controlled so that the potential difference between the toner image portion potential by the first developing means after the re-charge and the background potential after the re-charge is converged into a target level. The developer particle (reversed toner) which are charged to a polarity opposite to the normal polarity of the developer during the developing operation by the second developing means are prevented from depositing on the image bearing member. If there is unintended first developer particles in the background of the image bearing member are present, the developer is prevented from mixing into the second developing means. As a result, a high quality multi-color image can be provided with an intended mixture of color and foggy background.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus, comprising:

a movable image bearing member;

first charging means for charging said image bearing member;

first latent image forming means for forming a first latent image in accordance with first image information on said image bearing member charged by said first charging means;

first developing means for developing the first latent image;

potential attenuating means for attenuating a potential of said image bearing member after at least said first latent image is developed;

second charging means for charging said image bearing member after at least the first latent image is developed;

second latent image forming means for forming a second latent image in accordance with second image information on an image bearing member charged by said second charging means;

second developing means for developing the second latent image;

image transfer means for transferring the first and second developed images from said image bearing member onto an image receiving material, wherein the first and second developed images are simultaneously transferred onto the same image receiving material;

potential detecting means for detecting a surface potential of said image bearing member; and control means responsive to an output of said potential detecting means to control at least one of said potential attenuating means and said second charging means to converge to a target level a potential difference between a potential, after being charged by said second charging means, of a portion developed by said first developing means and a potential, after being charged by said second charging means, of a background portion.

2. An apparatus according to claim 1, wherein said image bearing member includes a photosensitive member, and said first and second latent image forming means forms the latent images by applying light information to said photosensitive member in accordance with the image information.

3. An apparatus according to claim 2, wherein said first and second latent image forming means apply light correspondingly to the portion to be developed, and said first and second developing means reverse-develops the portion of said photosensitive member exposed to light.

4. An apparatus according to claim 3, wherein the light application by said first and second latent image forming means is effected by laser beams modulated by the respective pieces of image information.

5. An apparatus according to claim 1, wherein said first and second charging means charges said image bearing member to the same polarity.

6. An apparatus according to claim 1, wherein said first charging means, a latent image forming station including said first latent image forming means, said first developing means, said potential attenuating means, said second charging means, a second latent image forming station including said second latent image forming means, said second developing means are disposed in the order named in the direction of movement of said image bearing member.

7. An apparatus according to claim 6, wherein said image bearing member includes a photosensitive member, and wherein said first and second latent image forming means form latent images by applying light information in accordance with image information.

8. An apparatus according to claim 2 or 7, wherein said potential attenuating means includes light application means for uniformly exposing said photosensitive member.

9. An apparatus according to any one of claims 1, 2, 6 and 7, wherein said potential attenuating means includes an AC corona discharging means.

10. An apparatus according to claim 1 or 6, wherein said potential detecting means is disposed downstream of said potential attenuating means and said second charging means with respect to movement direction of said image bearing member.

11. An image forming apparatus, comprising:

a movable image bearing member;

first image forming means for forming a first image in accordance with first image information on said image bearing member;

potential attenuating means for attenuating a surface potential of said image bearing member after the first image is formed;

second image forming means for forming a second image in accordance with said image information on said image bearing member after being subjected to operation of said potential attenuating means;

potential detecting means for detecting a surface potential of said image bearing member;

control means responsive to said potential detecting means to control at least one of said potential attenuating means and said second image forming means; and image transfer means for transferring the first and second images from said image bearing member onto an image receiving material, wherein the first and second images are simultaneously transferred onto the same image receiving material.

12. An apparatus according to claim 1, wherein the first developed image and the second developed image are different in color.

13. An apparatus according to claim 1, wherein the portion developed by said first developing means is a developed portion of a latent image formed in accordance with a predetermined reference image information.

14. An apparatus according to claim 8, wherein said control means controls an amount of light by said light application means.

15. An apparatus according to claim 9, wherein said control means controls a peak-to-peak voltage of the AC corona discharging means.

16. An apparatus according to claim 13 or 14, wherein said control means controls a charging current by said second charging means.

17. An apparatus according to claim 1, wherein said control means controls said second charging means so as to converge to a target level of a potential, after being charged by said second charging means, of a background portion.

18. An apparatus according to claim 1, wherein said control means controls the developing conditions by said first developing means.

19. An apparatus according to claim 1, wherein said control means effects its controlling operation when a power source of said image forming apparatus is actuated, or when a predetermined period of time passes, or a predetermined number of image forming operations are performed after the power source is actuated.

20. An apparatus according to claim 10, wherein a plurality of said potential detecting means are provided for simultaneously detecting potential of said image bearing member at different positions.

21. An apparatus according to claim 1, wherein said potential detecting means is disposed between said second charging means and said second developing means.

* * * * *